United States Patent
Soldavini et al.

(10) Patent No.: US 6,820,561 B2
(45) Date of Patent: Nov. 23, 2004

(54) SORTING SYSTEM FOR TRANSFERRING ITEMS FROM A TROLLEY TO AN UNLOADING STATION IN RESPONSE TO THE DETECTION OF A MAGNETIC FIELD GENERATED AT THE UNLOADING STATION

(75) Inventors: Attilio Soldavini, Ferna-VA (IT); Guiseppe Di Giovanni, Gallarate-VA (IT)

(73) Assignee: Sandvik AB, Sandviken (SE)

( * ) Notice: Subject to any disclaimer, the term of this patent is extended or adjusted under 35 U.S.C. 154(b) by 160 days.

(21) Appl. No.: 10/022,246

(22) Filed: Dec. 20, 2001

(65) Prior Publication Data

US 2002/0079254 A1 Jun. 27, 2002

(30) Foreign Application Priority Data

Dec. 20, 2000 (IT) .................................... MI2000A2760

(51) Int. Cl.$^7$ ............................................. B65G 47/50
(52) U.S. Cl. ................................ 104/88.04; 104/88.03; 700/218; 198/350; 198/358; 198/370.06
(58) Field of Search ................................ 700/218, 223, 700/224, 230; 104/88.02, 88.03, 88.04; 198/350, 370.06, 358

(56) References Cited

U.S. PATENT DOCUMENTS

| | | | | |
|---|---|---|---|---|
| 3,100,040 A | * | 8/1963 | Kleist | ......................... 198/350 |
| 3,223,353 A | * | 12/1965 | Friedrich et al. | ............... 406/5 |
| 3,361,247 A | * | 1/1968 | Nelson et al. | ............... 198/350 |
| 3,617,890 A | * | 11/1971 | Kurauchi et al. | ........... 455/41.1 |
| 3,935,820 A | * | 2/1976 | Lancaster | ................ 104/88.02 |
| 4,038,926 A | * | 8/1977 | Holberry | ................. 104/172.2 |
| 4,471,356 A | | 9/1984 | Gidl | |
| 4,613,804 A | * | 9/1986 | Swenson | ..................... 318/587 |
| 4,792,036 A | * | 12/1988 | Heidelberg | ................. 198/619 |
| 4,915,030 A | * | 4/1990 | Matsuo et al. | ........... 104/88.04 |
| 4,938,335 A | * | 7/1990 | Canziani | ................ 198/370.06 |
| 5,005,690 A | * | 4/1991 | Gonser | ....................... 198/350 |
| 5,168,977 A | * | 12/1992 | van Essen et al. | .......... 198/364 |
| 5,236,156 A | * | 8/1993 | Zimmermann | ................. 246/5 |
| 5,588,520 A | * | 12/1996 | Affaticati et al. | ...... 198/370.06 |
| 5,701,992 A | * | 12/1997 | Enomoto | ............... 198/370.06 |
| 5,803,230 A | * | 9/1998 | Canziani et al. | ....... 198/370.06 |
| 5,927,657 A | * | 7/1999 | Takasan et al. | ............. 246/194 |
| 6,009,992 A | * | 1/2000 | Erceg et al. | ........... 198/370.04 |
| 6,089,512 A | * | 7/2000 | Ansorge et al. | ............. 246/194 |
| 6,191,752 B1 | * | 2/2001 | Lester et al. | ................ 343/867 |
| 6,247,576 B1 | * | 6/2001 | Bonnet | ................... 198/370.04 |
| 6,253,901 B1 | * | 7/2001 | Hintz et al. | ............ 198/370.06 |
| 6,571,933 B1 | * | 6/2003 | Gortz et al. | ................. 198/619 |

FOREIGN PATENT DOCUMENTS

| | | | | |
|---|---|---|---|---|
| EP | 0 481 341 | | 4/1992 | |
| EP | 0 556 866 | | 8/1993 | |
| GB | 2 218 957 A | | 11/1989 | |
| JP | 64-48716 | * | 2/1989 | ............ 198/370.06 |

* cited by examiner

*Primary Examiner*—Donald P. Walsh
*Assistant Examiner*—Daniel K Schlak
(74) *Attorney, Agent, or Firm*—Burns, Doane, Swecker & Mathis, L.L.P.

(57) ABSTRACT

A sorting system includes trolleys traveling along a path between respective stations for loading and unloading items in a direction transversely of the direction of travel of the trolleys. Each station includes an inductor for generating a variable magnetic induction field which is sensed by a detecting mechanism, such as an antenna, disposed on the trolley. In response to the magnetic induction field being detected, a loading/unloading device on the trolley (e.g., an endless belt) is actuated to load or unload items.

6 Claims, 5 Drawing Sheets

SORTING SYSTEM FOR TRANSFERRING ITEMS FROM A TROLLEY TO AN UNLOADING STATION IN RESPONSE TO THE DETECTION OF A MAGNETIC FIELD GENERATED AT THE UNLOADING STATION

This application claims priority under 35 U.S.C. §§119 and/or 365 to Patent Application Serial No. MI 2000 A 002760 filed in Italy on Dec. 20, 2000. The entire content of which is hereby incorporated by reference.

BACKGROUND OF THE INVENTION

This invention relates to methods and apparatus for activating and controlling sorting units in a sorting machine in which items are loaded onto, and unloaded from, movable sorting units in a direction transversely of a direction of travel of the units. Preferably the sorting units are of the "Cross Belt" type, wherein the sorting units consist of conveying belts mounted on supports moving along a fixed path and capable of being activated to receive and unload the carried objects in a direction perpendicular to the direction of motion of the sorting machine.

Each trolley is provided with an on-board electronic unit, capable of controlling the electric motor activating the trolley's conveying belt.

According to the invention, this electronic unit consists of a printed circuit comprising a few loops of a length nearly matching the pitch of the trolley, which generate a control signal to activate the unloading motor, whenever a ground-level induction set opposite each outlet is energized.

The branch dealing with sorting machines has in recent years witnessed a considerable diffusion of sorting machines known as a "Cross Belt" type.

These are installations in which a series of trolleys moves along a fixed linear path, a circle etc., while receiving the objects to be sorted whenever it passes some loading stations, so as to unload them in the planned collecting stations.

The trolley is usually equipped with a conveying belt capable of rotating independently in the two directions orthogonal to the direction of motion of the sorting machine.

The electric motors actuating the belts are activated during the loading phase of the objects, to ensure their precise positioning both at the moment of their unloading as well as for the precise routing of the objects to their appropriate destination, and the controlling of these sorting units is entrusted to a programmable controller (OLC, PC etc.), based on known technologies.

The purpose of this invention is to provide a simple and economical solution capable of using a sorting machine for orthogonal belts, with the resulting advantages, even in plants with a long path and a low number of outlets.

For these applications, the technologies already available for controlling the orthogonal sorting machines are not economically justified, as they involve complications without a commensurate value.

This invention refers to an equipment and a method capable of receiving the signals from said controlling devices, and of consequently activating the sorting unit needed for unloading the objects.

Various systems for controlling unloading belts are known at the present state of the art.

British Patent 2,218,957, for example, describes a sorting machine in which each trolley is equipped with a motor actuator, as well with gliding contacts which collect the activating controls originating from the control system from appropriately selected busways set opposite every sorting machine area where an activation is expected, for instance next to the collecting devices.

When the sorting unit passes the area in which it must be activated, the control system sends a signal to the actuating unit, which transfers the motor's power to the unit, so as to start the rotation of the small belt and unload the transported object.

The electrical power is brought on-board the trolley by a system of busways running along the sorting path together with the busway sections.

This type of activating mode is valid but demands a high number of sectioned busways, gliding contacts and their relative wirings, in order to enable the control system to send out its signals to each trolley.

If one considers that a sorting system generally comprises hundreds of separate collecting devices which involve the need for as many sections and wirings, and that the trolleys in such systems often also run into the hundreds, it can easily be grasped that a control system as described above can be complex and costly.

European Patents No. 0 556 866 and No. 0 481 341 describe a sorting system where the trolleys are equipped with on-board intelligent units which allow them to eliminate the sectioned busways along with their relative sliding contacts and electrical wirings.

This system provides for sending out some control signals through the continuous busways, which are decoded and interpreted by the processing units on-board the trolleys and forwarded to the motor activating units. The entire train of trolleys is normally subdivided in groups, each comprising only a few trolleys, where only one "master" trolley is equipped with sliding contacts, thus greatly reducing the overall number of contacts installed. The electrical power is on the contrary picked up from continuous busways running along the path.

This system is particularly effective in applications requiring a very high number of destinations, but is less so, for solely cost-related reasons, in applications with a limited number of destinations.

In applications involving sorting machines of great length or having a low number of outlets along their path, the great sophistication of having on-board controls is in fact not economically justified.

A further system for simplifying these installations provides for generating the electrical power for the belt activating motor by using batteries installed on-board and kept charged by alternators, which mechanically derive their motion from the very motion of the sorting machine.

The activation is controlled by infrared ray signals, generated by an emitter set opposite each collecting device.

On-board the trolley, a receiver decodes and interprets the infrared signal and actuates the belt through an activating unit.

However, even this system exhibits a number of problems, because it is sensitive to external influences such as intense and direct light, dirt or the like, moreover, every trolley or at any rate a considerable number of trolleys must be equipped with various expensive equipment items such as batteries, alternators and the like.

This also means a high complexity of the controlling system on-board.

At the state of the art, there are finally some sorting machines of the "Cross Belt" type, which provide for certain ground-level mechanical devices engaging with other devices on the trolleys, designed to rotate the belt.

This latter system is rather cumbersome, considerably expensive, noisy and troublesome, especially from the mechanical maintenance viewpoint.

This invention intends eliminating the mentioned drawbacks in the applications having a low number of outlets, with a minimum number of on-board controls which must in any event allow operating at the values actually perceived in these applications.

Reliability: the trolley motor must be controlled by an on-board actuating system capable of ensuring its use within its operating limits.

Accuracy: the conveying belt must be activated at a controlled accelerating and speeding rate, so that the speed profile during the sorting process can be repetitive and largely independent of the weight of the sorted object.

Flexibility: the activating point pertaining to each outlet must be variable, based on an sw-signal, to allow a number of trajectories for the sorting of objects. The various trajectories are chosen based on the characteristics of the objects, the speed of the sorting machine, or the best distribution of the objects sorted inside the outlet. The duration of activating the belt must be variable in order to allow for correcting the position of the transported object.

SUMMARY OF INVENTION

In order to satisfy the mentioned requirements, while using the simplifications made possible by the type of dedicated applications (low number of outlets, possibility for a single type of speed ramp (accelerating the final speed, thanks to larger outlets), a solution was developed which envisions a simple actuating system, associated with the motor whose only control parameters (actuating point, activating direction, etc.) are easily controlled from the ground, while exploiting the laws of electromagnetic induction in a simple manner. A magnetic induction field is generated at a station and transmitted to an electronic unit on the trolley, which activates a device for unloading items in response to detecting the induction field.

BRIEF DESCRIPTION OF THE DRAWINGS

This invention will now be described in detail, for exemplifying but not limiting purposes, with reference to the enclosed figures depicting a preferred embodiment in which.

DETAILED DESCRIPTION OF A PREFERRED EMBODIMENT OF THE INVENTION

Figure 1:
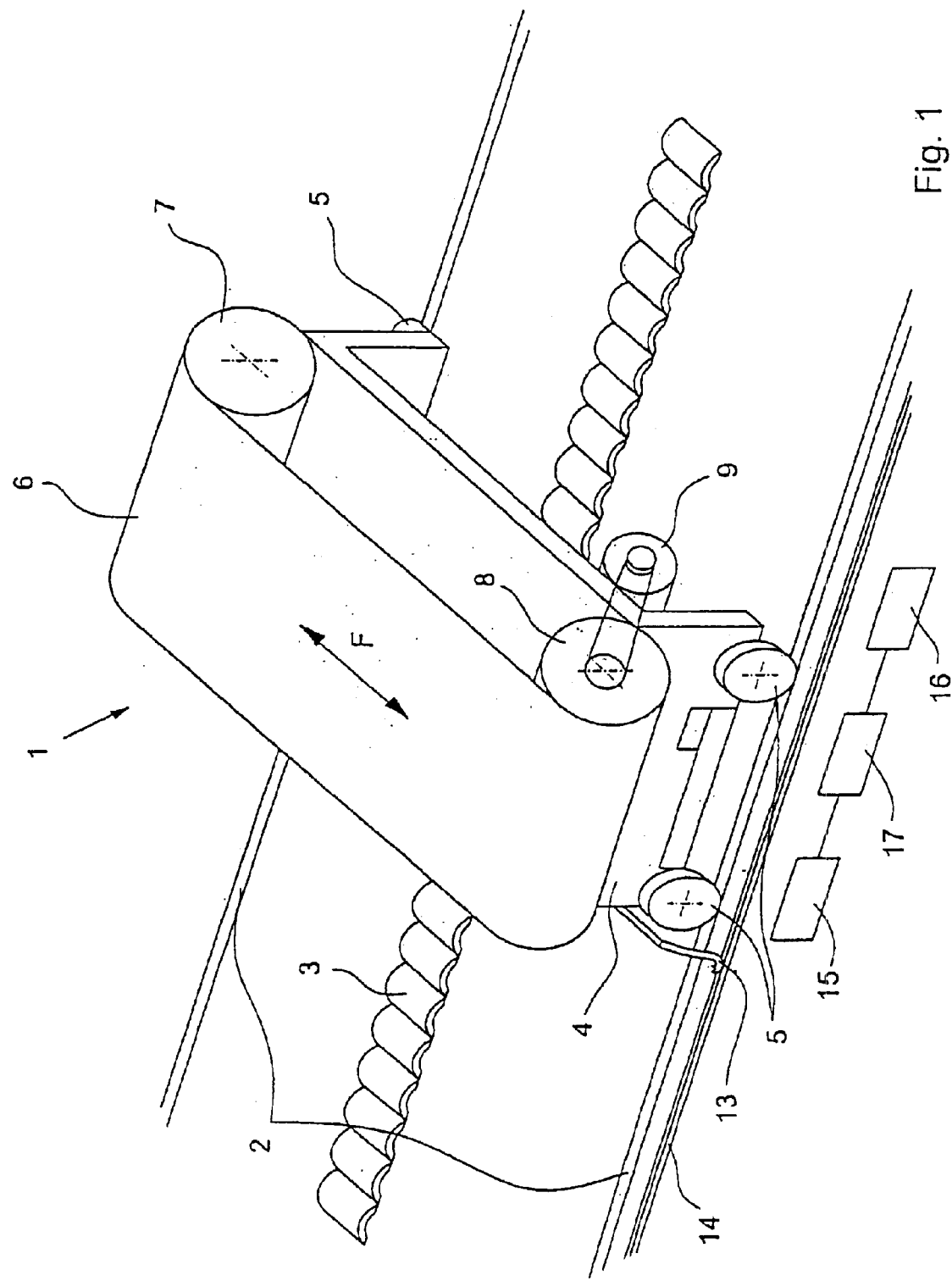
FIG. 1 offers a simplified drawing of a trolley of a sorting machine according to the invention, using the respective devices for activating the conveying belt for an unloading operation, FIG. 1A offers a simplified view of a train of trolleys during an unloading phase, FIG. 2 offers the on-board electronic unit coupling with the variable magnetic field generated by the ground-level inductor, FIG. 3 offers examples of digital signals produced by the control system, and the resulting effects on the motion of the conveying belt for the unloading operation, FIG. 4 offers a block diagram of the inductor fitted on the outlets, and of the controlling device from the same, FIG. 5 offers a block diagram of the electronic unit on-board of the trolleys.
Figure 1A:
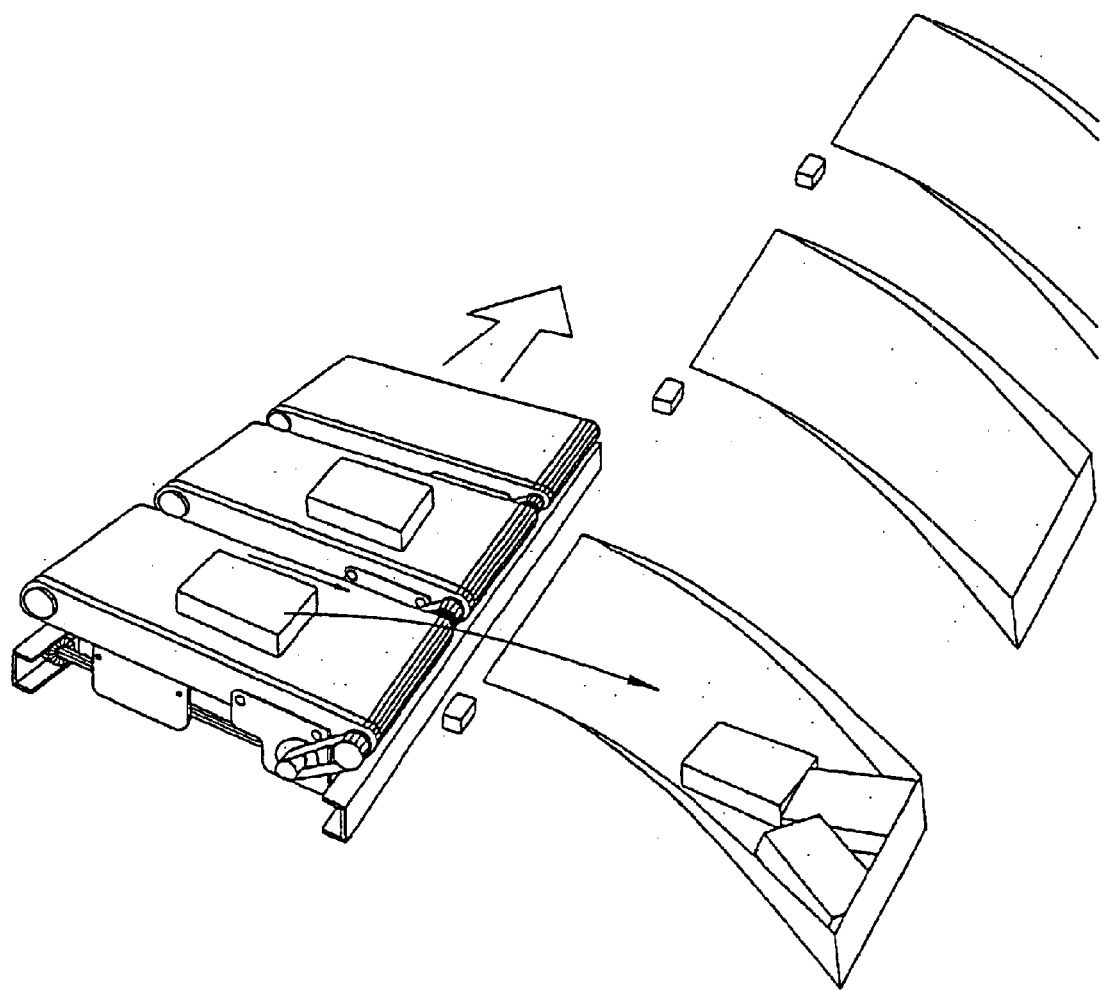

With reference to FIG. 1, the number 1 indicates the overall form of a trolley as part of a sorting machine according to the invention, while moving along a fixed path 2 under the pull of a chain 3 or of another similar device. Each trolley comprises a frame 4 equipped with wheels 5 and connected in a swivelling manner with adjacent trolleys (not shown), so as to constitute an uninterrupted train along the path 2, that is, a circuit faced by all the outlets, sorting points, and collecting devices located thereat.

Each trolley is equipped with a conveying belt 6 set stretched between the rollers 7 and 8 and activated by a continuous current motor 9.

Opposite each collecting device, such as a container, unloading hopper, chute or the like, the system provides a controlling unit comprising an inductor 15 connected to an oscillator 17, which is in turn connected to a controlling and handling system 16 for the machine.

Whenever the sorting unit 1 arrives near the destination for the object it carries on-board and must be activated for an unloading operation, the control system 16 sends out a digital signal to the inductor 15 (for example 24 V, 0.5 A).

Figure 2:
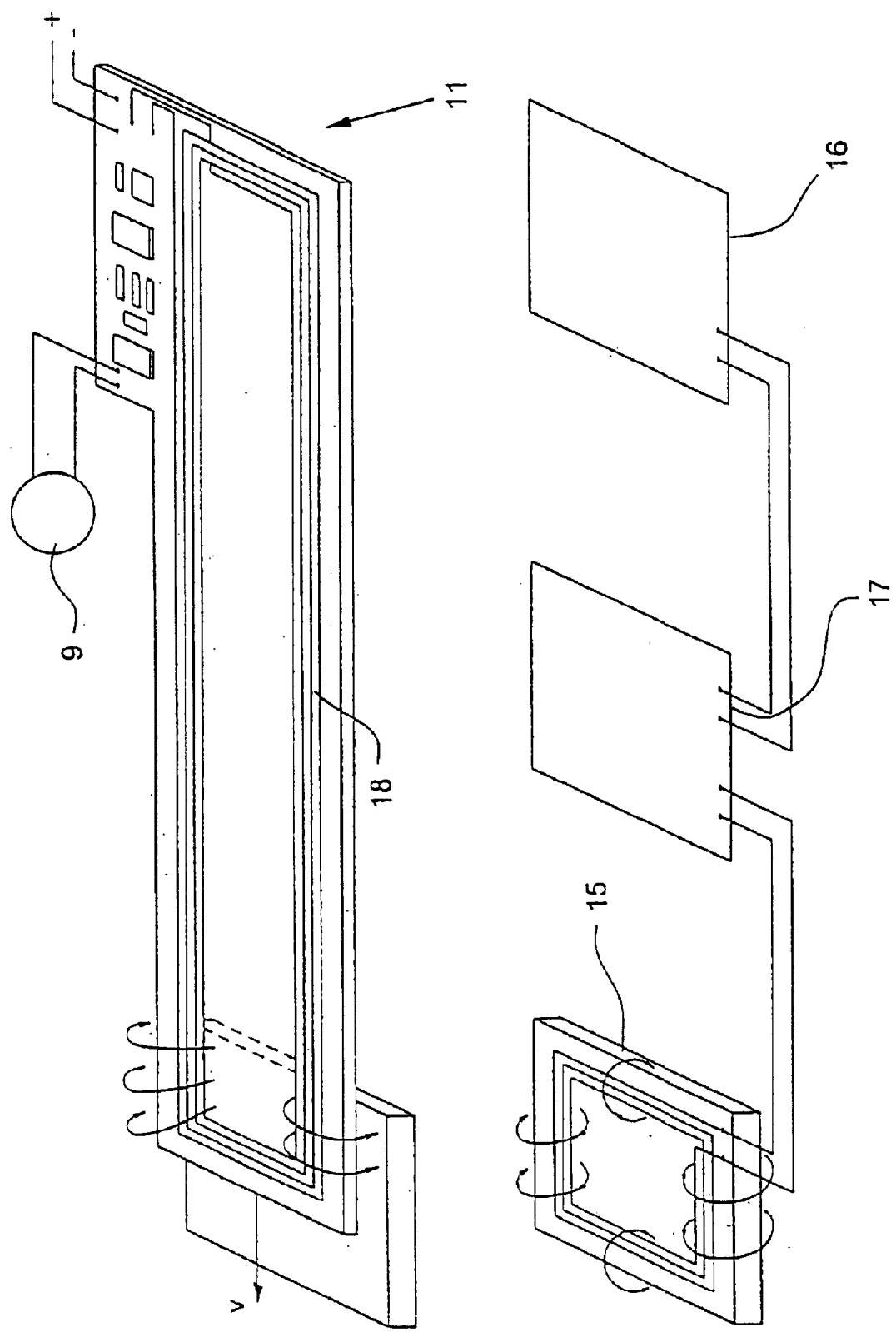

This periodic signal is appropriately amplified in the inductor 15, so as to create a variable magnetic field depending on the loops of the antenna 18 of an electronic unit 11 disposed on-board the trolley 1 (see FIG. 2).

FIG. 2 shows said electronic unit 11 in detail, and evidences the antenna 18 which consists of a number of loops derived from the same printed circuit, of a length slightly inferior to the size of the trolley in the sense of its forward motion.

Said loops constitute the antenna 18 of the electronic unit 11 crossed by the variable magnetic field produced by the inductor 15.

This generates a variable magnetic field across the surface enclosed between the loops of the antenna 18 of the electronic unit 11.

Based on the known laws of electromagnetic induction, the flow of energy, which varies based on the frequency set up by the inductor 15, generates an electric signal in the loops of the electronic unit 11, which varies with the same frequency. Said variable frequency is utilized to control the electronic unit 11.

The presence of the signal determines the type and duration of the control. The value of the frequency is determined by an appropriate filter selecting the band between two chosen frequencies, and can, if necessary, determine the sense of activating the conveying belt 6 for the unloading operation.

It should be noted that thanks to the mentioned laws, the information transmitted by using the inductive coupling device is independent of the relative position between the inductor 15 and the antenna 18 of the electronic unit providing they are facing each other, and is also independent of the relative velocity between them.

The electronic unit 11 also comprises a function of "extending" the signal, by holding it for a pre-established length of time, so as to allow a free choice in choosing the point of activation, without excessive limitations due to the limited length of the loops.

Figure 3:
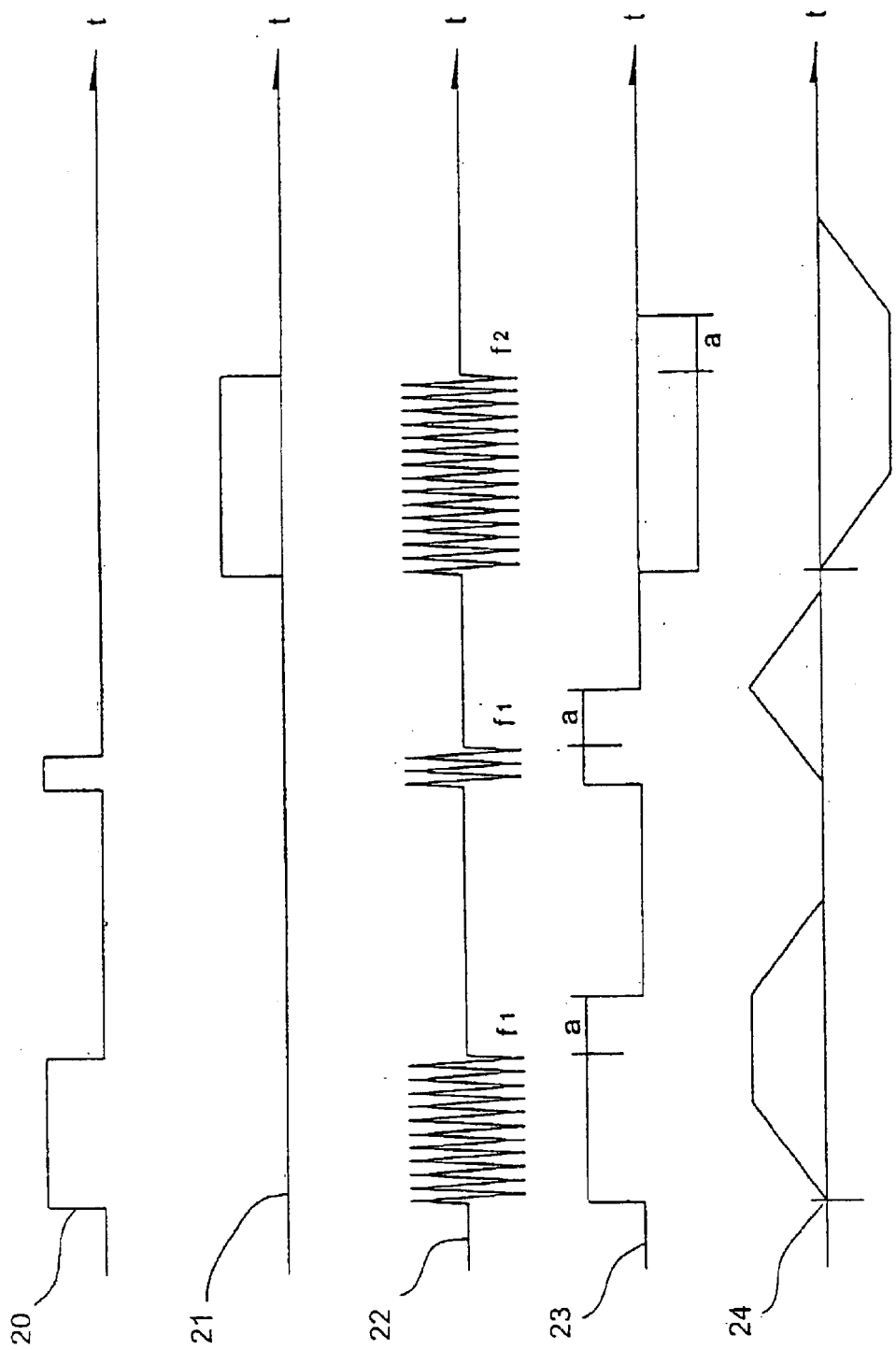

FIG. 3 shows the typical reactions to the various signals.

The control system 16 sends the oscillator 17 one of two unloading signals 20, 21, depending on the side of the trolley on which the unloading must occur, whenever the trolley happens to face the outlet.

Said signals are waves of a preestablished duration and cause, depending on the unloading mode and whether they control the unloading from one or the other side of the trolley, the emission of a periodic signal 22 of a frequency f1 or f2 from the oscillator 17. As a result, the inductor 15 generates a magnetic induction field which varies at the same frequency.

The controller of the motor 9 integrated in the on-board electronic circuit 11 will, after discriminating between the frequencies f1 and f2 while using an appropriate band selecting filter, emit a signal 23 consisting of square positioning waves on the axis corresponding to the signals 22, with an appropriate extension and signal depending on the frequencies f1 and f2, so as to perform the unloading operation on one or the other side of the trolley. As a result of the above, the conveying belt moves forward in the sense determined by the signal emitted, and the velocity profile is represented by the diagram 24.

The antenna 18 of the on-board electronic unit 11 consists of a few loops, where said loops may be of any needed size, while said sizes are preferably of the order of the size of the trolley, measured in the sense of the forward motion of the sorting unit.

This will allow an easy modulation of the signals, so as to achieve small corrections in the position of the object carried, or various activating programs so as to make available a number of loading operations.

More generally, the fact of providing an antenna 18 having a size similar to that of the trolley allows to determine various unloading trajectories for the objects, simply by acting on the instant in which the controlling system 16 sends out the signal signals to the oscillator 17.

Figure 4:
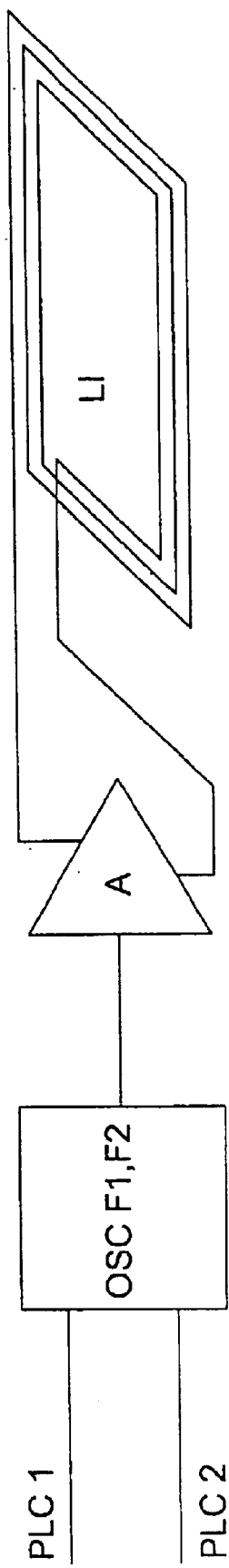

FIG. 4 shows the block diagram 15 set on the outlets and the controlling device of the same, which corresponds to the lower part of FIG. 2.

With reference to FIG. 4:

PLC1 and PLC2 are signals originating from the control system 16 of the sorting machine, OSC F1, F2 are from the oscillator 17, which generates periodical signals at the frequency F1 and F2, depending on whether it receives the signals PLC1 or PLC2, as well as depending on the side of the trolley on whose side the unloading operation is to be performed.

L1 are the loop's of the inductor 15.

Figure 5:
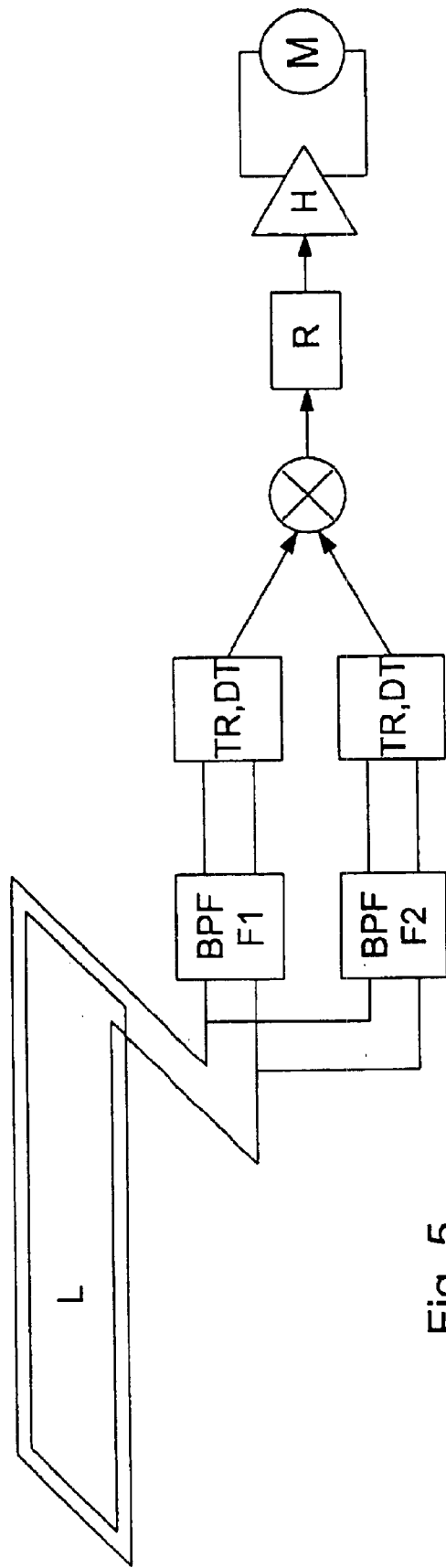

FIG. 5 shows the block diagram of the electronic unit on-board of the trolleys, which corresponds to the upper parts for figures. With reference to said FIG. 5:

L are the loops of the antenna 18, designed to couple with the ground-level inductor 15.

BPF F1 (F2) is the band range selecting unit agreed on the frequency F1.

TR, DT is the threshold circuit to generate the signal and to extend it for a pre-established interval of time.

R is the ramp generator to generate accelerating and decelerating ramps at pre-established values (for instance, 4 m/sec2), and a velocity stabilized at the pre-established value.

F is the servo-amplifier fitted with a retroacting device and a limitation in the curve, M is the motor 9 for activating the conveying belt 6 on the trolley 1.

This application to the fields of the sorting machines of the signaling technologies based on the use of magnetic induction offers considerable advantages, such as:

In contrast to the signals based on using infrared rays as in the prior art, the control according to this invention is insensitive to dust and light. Moreover, it is particularly resistant with respect to electromagnetic disturbances, due to the low impedance of the circuit and the presence of filters. The emission of electromagnetic disturbances is of negligible effect due to the extremely low power level employed. Even the critical phenomenon of inductive coupling depending on the distance between the inductor and the on-board electronic unit does not constitute a problem in the case of the sorting machine, because said inductors based on electronic units are easily inserted in a protected position, and the changes in their respective distance during the lifetime of the machine are negligible.

The sensitive area of the on-board electronic unit 11 is the same printed circuit in which the loops constituting the antenna 18 are easily obtained, and where electronic circuits controlling the motor have been arranged. The integration is particularly simple and economically valid.

The length of the loops and the favorable characteristics of the inductive coupling allow the necessary flexibility, while the intrinsic integration with the motor control circuits allows securing the needed features of reliability and accuracy at minimum cost.

The application to sorting machines of the controlling technology based on the electromagnetic induction system heretofore used only in other branches affords advantages of undoubted value, such as in particular:

A system based on the induction and reception of electromagnetic signals of a given sequence, insensitive to light and dust: this aspect is fundamental in order to guarantee performances which remain unchanged in the course of time;

An answer to the ever growing sorting demands, requiring some quality equipment independently of the transporting speed of the sorting machine: electromagnetic induction and reception are properly meeting this requirement;

There's a considerable simplification of the installation, with substantial advantages in terms of production costs and above all of maintenance and reliability.

The fact of being able to produce a receiving antenna 18 of a size comparable to the pitch of the trolleys allows extending the time period during which the antenna 18 is near the inductor 15, with the resulting advantage of making it possible to control the operation of the sorting unit 1 depending on the object to be sorted at any given instant. Because of the availability of ground-level inductors spaced out between them like the pitch of the trolley, the controlling system would make it possible, if necessary, to extend the selective control of each single trolley, thus easily controlling the individual inductors.

If a two-way functioning induction and reception system were to be employed, the intrinsic bi-directionality of the laws of electromagnetic induction between windings and an appropriate disposition of the circuit 11 would easily make it possible to actuate a bidirectional transmission of information in order to secure a confirmation about the unloading operation, diagnostic information, or a confirmation of the proper reception of configurating information.

This would occur by operating the antenna 18 as a transmitter and the inductor 15 as a receiver, and by connecting said inductor 15 with the controlling and handling system of the machine.

Some technologies for exchanging information between by inductive magnetic couplings between circuits are known for this purpose: the information, coded in a serial binary code, may be transferred by modulating the intensity of the variable magnetic field, or by varying the frequency of the field itself.

The text specifically quotes the example of machine of a "Cross-Belt" type, but the same invention may be applied to sorting machines other than those of a "Cross Belt" type. For instance, some sorting machines are known to be of the tiltable plate type, where the tilting of the plate is entrusted to an electric device (motor, electromagnet, etc.); even in this case, an electric power supply on-board of the trolley is required, and the invention may be applied in the same manner as applying it to a "Cross Belt" type sorting machine.

Any expert in the branch may further envision various modifications and variants, all of which are however to be considered as falling within the scope of this invention.

What is claimed is:

1. A sorting system comprising:
   a trolley movable to a selected unloading system, the trolley including an unloading device for unloading an item in a direction,
   a main handling mechanism for generating a digital signal,
   field-generating means at the unloading station for receiving the digital signal and generating a magnetic field in response thereto, and
   field-detecting means disposed on the trolley for detecting the magnetic field and actuating the unloading device in response thereto.

2. The system according to claim 1 wherein the field-generating means constitutes means for generating magnetic fields at different frequencies for determining a direction of unloading at the trolley.

3. The system according to claim 1 wherein field-generating means comprises an inductor, and the field-receiving means comprises an antenna.

4. The system according to claim 3 wherein the field-detecting means includes means for inverting the magnetic field back to the field-generating means for transmitting information from the trolley to the main handling mechanism.

5. The system according to claim 1 wherein the field-generating means comprises an inductor, and the field-receiving means includes sensors for generating an electrical signal in the presence of a magnetic field.

6. The system according to claim 1 wherein the unloading device comprises an endless conveyor.

* * * * *